US010097625B2

(12) United States Patent
Saito

(10) Patent No.: US 10,097,625 B2
(45) Date of Patent: Oct. 9, 2018

(54) PROGRAM, INFORMATION PROCESSING APPARATUS, AND COMMUNICATION SYSTEM

(71) Applicant: BROTHER KOGYO KABUSHIKI KAISHA, Nagoya-shi, Aichi-ken (JP)

(72) Inventor: Ken Saito, Tokoname (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 158 days.

(21) Appl. No.: 14/496,584

(22) Filed: Sep. 25, 2014

(65) Prior Publication Data

US 2015/0095463 A1     Apr. 2, 2015

(30) Foreign Application Priority Data

Sep. 30, 2013   (JP) .................................. 2013-204123

(51) Int. Cl.
G06F 15/16      (2006.01)
H04L 29/08      (2006.01)
H04L 29/06      (2006.01)

(52) U.S. Cl.
CPC ...... H04L 67/1002 (2013.01); H04L 63/0807 (2013.01); H04L 67/02 (2013.01)

(58) Field of Classification Search
USPC ....................................... 709/217, 219, 223
See application file for complete search history.

(56) References Cited

U.S. PATENT DOCUMENTS

| 2010/0245885 | A1* | 9/2010 | Selvaraj | G06F 3/1205 358/1.15 |
| 2012/0212760 | A1* | 8/2012 | Sakura | G06F 3/1204 358/1.13 |
| 2012/0314250 | A1 | 12/2012 | Ito | |
| 2013/0003106 | A1* | 1/2013 | Nishida | G06F 3/1222 358/1.14 |

FOREIGN PATENT DOCUMENTS

| JP | 2012-173816 A | 9/2012 |
| JP | 2012-256225 A | 12/2012 |
| JP | 2013-033437 A | 2/2013 |

OTHER PUBLICATIONS

Office Action from corresponding Japanese Patent Application No. 2013-204123, dated Mar. 14, 2017.

* cited by examiner

Primary Examiner — Joseph E Avellino
Assistant Examiner — Marshall McLeod
(74) Attorney, Agent, or Firm — Merchant & Gould P.C.

(57) ABSTRACT

A non-transitory computer-readable medium of this disclosure has instructions controlling a computer of an information processing apparatus including a storage unit and a communication unit capable of performing communication with a device and a server machine. The instructions, when executed by the computer, control the computer to perform operations including: installing a device driver of the device; acquiring identification information from the server machine through the communication unit after the computer starts the installing; acquiring, from the server machine, a token or token acquisition information for acquiring the token from the server machine, which are associated with the identification information; storing the acquired identification information in the storage unit; and transmitting the acquired token or the acquired token acquisition information to the device through the communication unit.

19 Claims, 12 Drawing Sheets

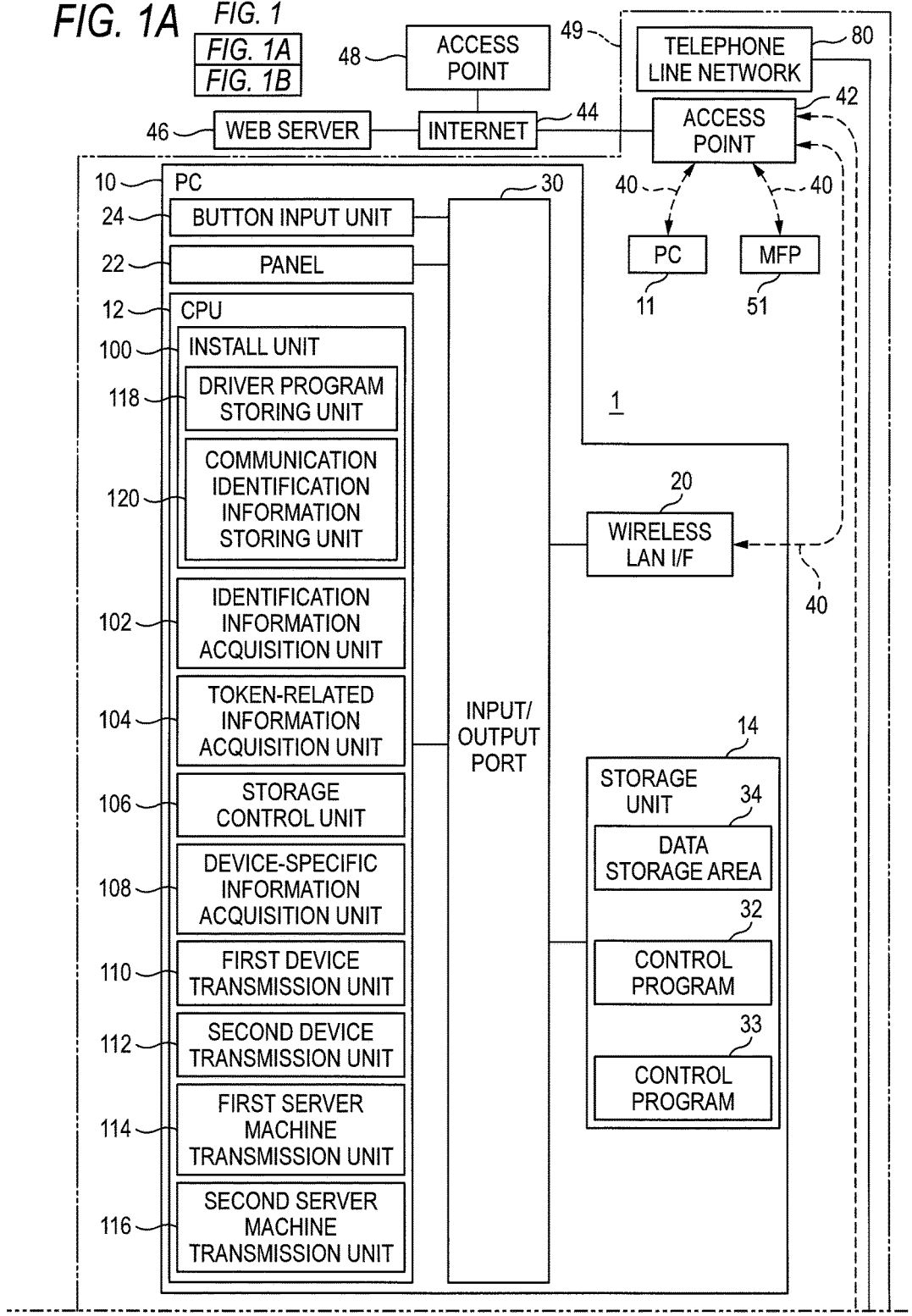

PROGRAM, INFORMATION PROCESSING APPARATUS, AND COMMUNICATION SYSTEM

CROSS-REFERENCE TO RELATED APPLICATION

This application claims priority from Japanese Patent Application No. 2013-204123 filed on Sep. 30, 2013, the entire subject matter of which is incorporated herein by reference.

TECHNICAL FIELD

This disclosure relates to a program that can be read by a computer, in an information processing apparatus, capable of performing communication with a device and a server machine, an information processing apparatus, and a communication system having an information processing apparatus and a device.

BACKGROUND

There is a technology for transmitting a printing command to a device from an information processing apparatus and performing printing processing and the like through the Internet, even though a device such as a printer and an information processing apparatus configured to transmit the printing command and the like to the device do not exist in the same LAN (Local Area Network).

SUMMARY

However, in the background art, in order to use the such technology, the device and the information processing apparatus are necessarily provided with identification information, a token and the like for using a server machine on the Internet, respectively. Also, it is necessary to register the identification information, the token and the like in the server machine, so that a troublesome operation is required.

In view of the above, this disclosure is to provide at least a technology of enabling a device to be used through an Internet without a troublesome operation.

In view of the above, a non-transitory computer-readable medium of this disclosure has instructions controlling a computer of an information processing apparatus including a storage unit and a communication unit capable of performing communication with a device and a server machine. The instructions, when executed by the computer, control the computer to perform operations including: installing a device driver of the device; acquiring identification information from the server machine through the communication unit after the computer starts the installing; acquiring, from the server machine, a token or token acquisition information for acquiring the token from the server machine, which are associated with the identification information; storing the acquired identification information in the storage unit; and transmitting the acquired token or the acquired token acquisition information to the device through the communication unit.

An information processing apparatus of this disclosure includes a computer, a storage unit and a communication unit capable of performing communication with a device and a server machine. The computer is configured to perform operations including: installing a device driver of the device; acquiring identification information from the server machine through the communication unit after the computer starts the installing; acquiring, from the server machine, a token or token acquisition information for acquiring the token from the server machine, which are associated with the identification information; storing the acquired identification information in the storage unit; and transmitting the acquired token or the acquired token acquisition information to the device through the communication unit.

A communication system of this disclosure includes a device having a device control unit, and an information processing apparatus including a storage unit and a communication unit capable of performing communication with a device and a server machine, and an information-processing-apparatus control unit. The information-processing-apparatus control unit performs operations including: installing a device driver of the device; acquiring identification information from the server machine through the communication unit after the computer starts the installing; acquiring, from the server machine, a token or token acquisition information for acquiring the token from the server machine, which are associated with the identification information; storing the acquired identification information in the storage unit, and transmitting the acquired token or the acquired token acquisition information to the device through the communication unit, and wherein the device control unit performs operation including: acquiring the token or the token acquisition information transmitted by the information-processing-apparatus; and performing communication with the server machine by using the token which is one of 1) transmitted by the information-processing-apparatus and 2) acquired from the server machine based on the token acquisition information.

According to the above-described configuration of this disclosure, when the device driver is installed in the information processing apparatus, the identification information is automatically acquired from the server machine and is stored in the information processing apparatus. Further, the token or the token acquisition information for acquiring a token from the server machine, which are associated with the identification information, is automatically transmitted to the device. That is, the operation for installing the device driver includes a step of automatically acquiring the identification information from the server machine and storing the identification information in the information processing apparatus and a step of automatically transmitting the token associated with the identification information to the device or token acquisition information. Thereby, the device driver is installed in the information processing apparatus, so that the identification information, the token and the like are automatically registered in the server machine. Thus, it is possible to use the device through the Internet without a troublesome operation.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

<Configuration of Communication System>

Figure 1B:
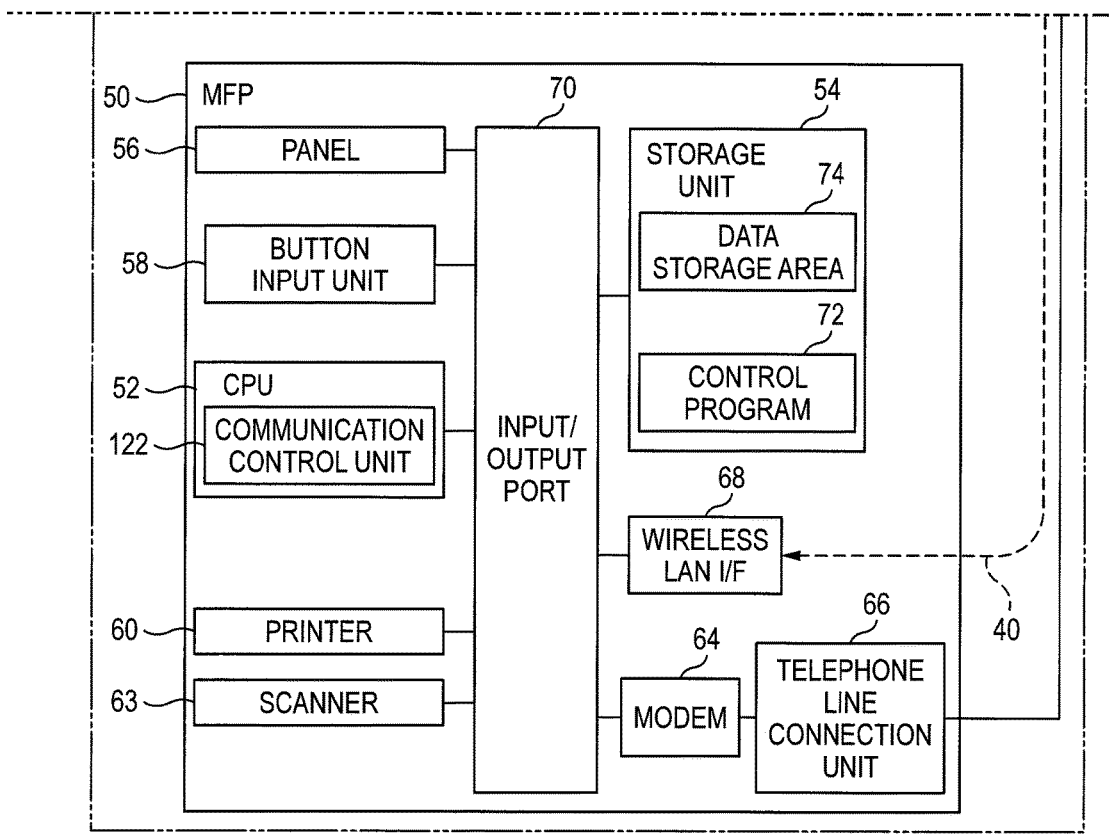
FIG. 1, which is composed of FIG. 1A and FIG. 1B, is a block diagram of a communication system.

FIG. 1, which is composed of FIG. 1A and FIG. 1B, is a block diagram of a communication system 1 exemplified as an illustrative embodiment of this disclosure. The communication system 1 is provided with a PC (Personal Computer) (an example of the information processing apparatus of this disclosure) 10, a PC (an example of the information processing apparatus of this disclosure) 11, an access point 42, an Internet 44, a web server (an example of the server machine of this disclosure) 46, an access point 48, an MFP (Multifunction Peripheral) (an example of the device of this disclosure) 50 and an MFP (an example of the device of this disclosure) 51. The PCs 10, 11 and the MFPs 50, 51 have a function of a wireless LAN terminal that has been already known and can transmit and receive data each other through the access point 42. In the meantime, the devices configured to transmit and receive data through the access point 42, i.e., the PCs 10, 11 and the MFPs 50, 51 exist in the same LAN (Local Area Network). Also, the MFPs 50, 51 are multifunction peripherals having printer, scanner, copy, facsimile functions and the like. The web server 46 is an apparatus configured to provide a function and data thereof to a client apparatus on a network.

Since the PC 10 and the PC 11 have the same configuration, a configuration of the PC 10 is representatively described. The PC 10 is mainly provided with a CPU (Central Processing Unit) (an example of the information-processing-apparatus control unit and the computer of this disclosure) 12, a storage unit 14, a wireless LAN I/F (an example of the communication unit of this disclosure) 20, a panel 22 and a button input unit 24. These elements are configured to perform communication each other through an input/output port 30.

The wireless LAN I/F 20 is configured to perform wireless communication 40 (data communication using a radio wave) based on an infrastructure mode of a wireless LAN system (a mode with which a plurality of wireless LAN terminal performs data communication through an access point). The wireless communication 40 is wireless communication of a Wi-Fi type based on an IEEE 802.11 standard and standards conforming to the standard. That is, when the PC 10 accesses the access point 42 and a state where the wireless communication 40 of a wireless LAN system can be performed is made, the PC 10 can perform data communication with other devices connected to the access point 42. Further, when the access point 42 is connected to the Internet 44, the PC 10 can perform data communication with an apparatus at an outside of a LAN 49, for example, the web server 46 through the access point 42.

The CPU 12 is configured to execute processing, in response to a control program (an example of the program of this disclosure) 32 or control program (an example of the program of this disclosure) 33 in the storage unit 14. The control program 32 is a program for installing a device driver of the MFP 50. The control program 33 is a program for installing a device driver of the MFP 51. In the meantime, the storage unit 14 is configured by a combination of a RAM (Random Access Memory), a ROM (Read Only Memory), a flash memory, an HDD (Hard Disk Drive), a buffer of the CPU 12 and the like. Also, the storage unit 14 has a data storage area (an example of the storage unit of this disclosure) 34. The data storage area 34 is an area configured to store therein image data to be displayed on the panel 22, data required to execute the control programs 32, 33, and the like.

The button input unit 24 is configured by a keyboard to receive a button operation of a user. The panel 22 is configured to display an image acquired using data communication and the like, a letter input through the button input unit 24, and the like.

Since the MFP 50 and the MFP 51 have the same configuration, a configuration of the MFP 50 is representatively described. The MFP 50 is mainly provided with a CPU (an example of the device control unit of this disclosure) 52, a storage unit 54, a panel 56, a button input unit 58, a printer 60, a scanner 62, a modem 64, a telephone line connection unit 66 and a wireless LAN I/F 68. These elements are configured to perform communication each other through an input/output port 70.

The wireless LAN I/F 68 is configured to perform the wireless communication 40 based on the infrastructure mode of a wireless LAN system. The wireless communication 40 is the wireless communication of a Wi-Fi type. That is, when the MFP 50 accesses the access point 42 and a state where the wireless communication 40 of a wireless LAN system can be performed is made, the MFP 50 can perform data communication with other devices connected to the access point 42. Further, when the access point 42 is connected to the Internet 44, the MFP 50 can perform data communication with an apparatus at the outside of the LAN 49 through the access point 42.

The modem 64 is configured to modulate the image data and the like into a signal to be transmitted to a telephone line network 80 and then to transmit the same through the telephone line connection unit 66 and is also configured to receive a signal input from the telephone line network 80 through the telephone line connection unit 66 and to demodulate the image data and the like. Thereby, the MFP 50 can perform facsimile transmission and reception.

The CPU 52 is configured to execute processing, in response to a control program 72 in the storage unit 54. The control program 72 is a program for performing data communication with the PC 10 or web server 46. In the meantime, the storage unit 54 is configured by a combination of a RAM, a ROM, a flash memory, an HDD, a buffer of the CPU 52 and the like. Also, the storage unit 54 has a data storage area 74. The data storage area 74 is an area configured to store therein image data to be displayed on the panel 56, data required to execute the control program 72, and the like.

The panel 56 has a display surface configured to display a variety of functions of the MFP 50. The button input unit 58 has a touch sensor and is configured integrally with the panel 56. The button input unit 58 is configured to detect an approach/contact of an input medium to the panel 56, thereby receiving a button operation of a user. Also, the button input unit 58 has an operation button. When the operation button is pushed by a user, the button input unit 58 receives a button operation of the user.

The printer 60 is a unit for executing a printing operation. The scanner 62 is a unit for executing a scan operation.

<Install of Device Driver and Registration for Cloud Service>

Figure 2:
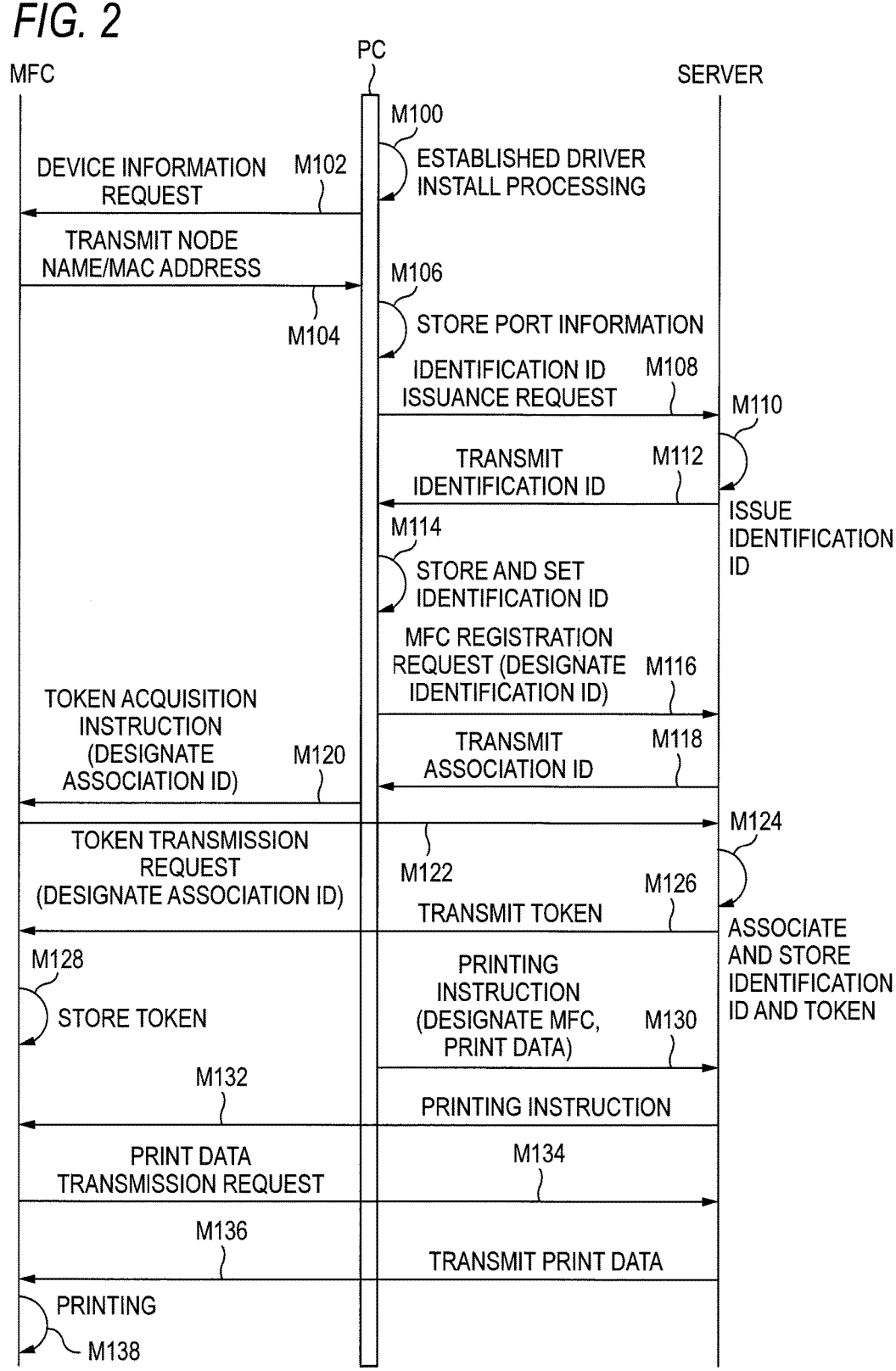
FIG. 2 is a sequence diagram of printing processing in the communication system.
Figure 3:
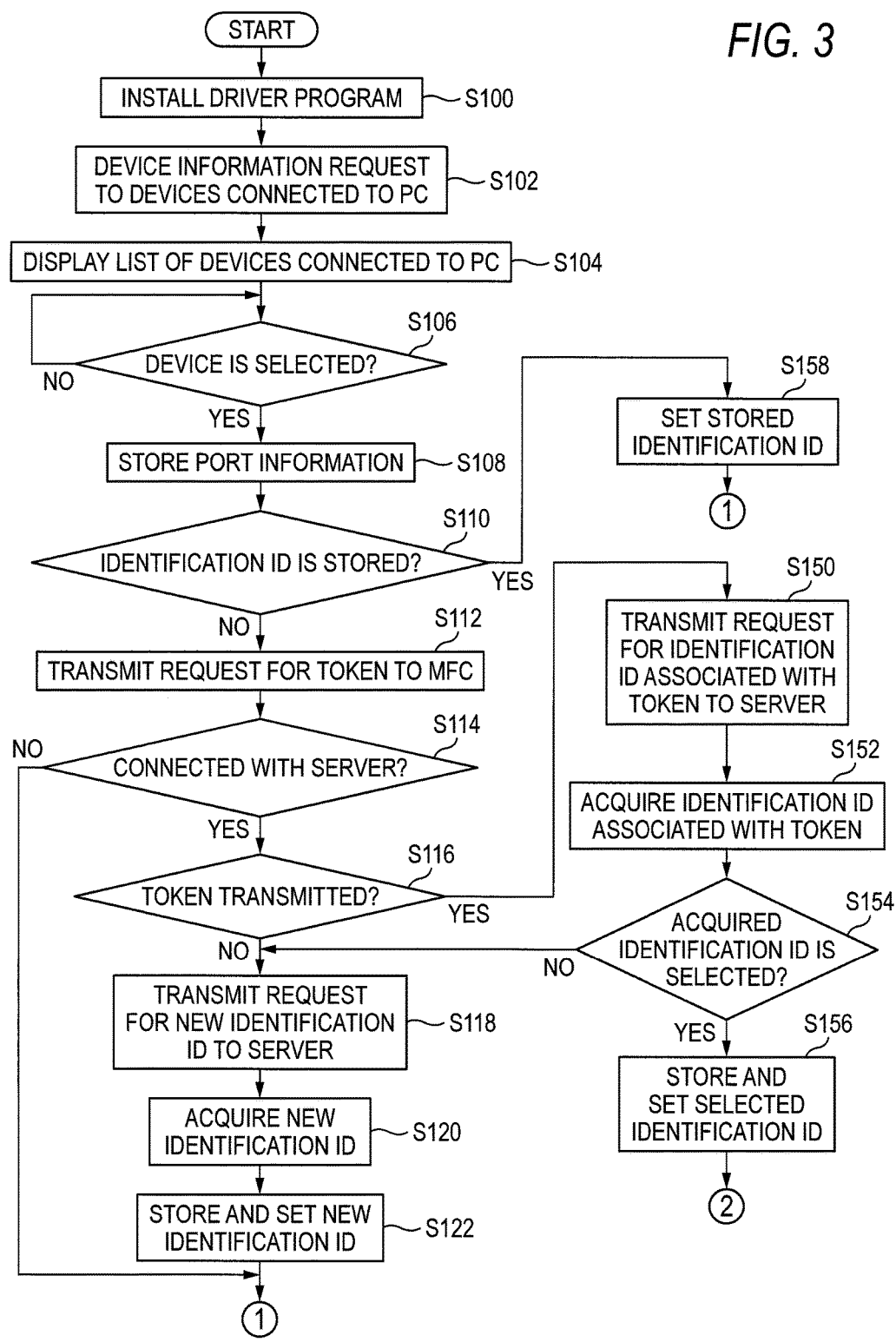
FIG. 3 is a flowchart illustrating operations of a PC.
Figure 4:
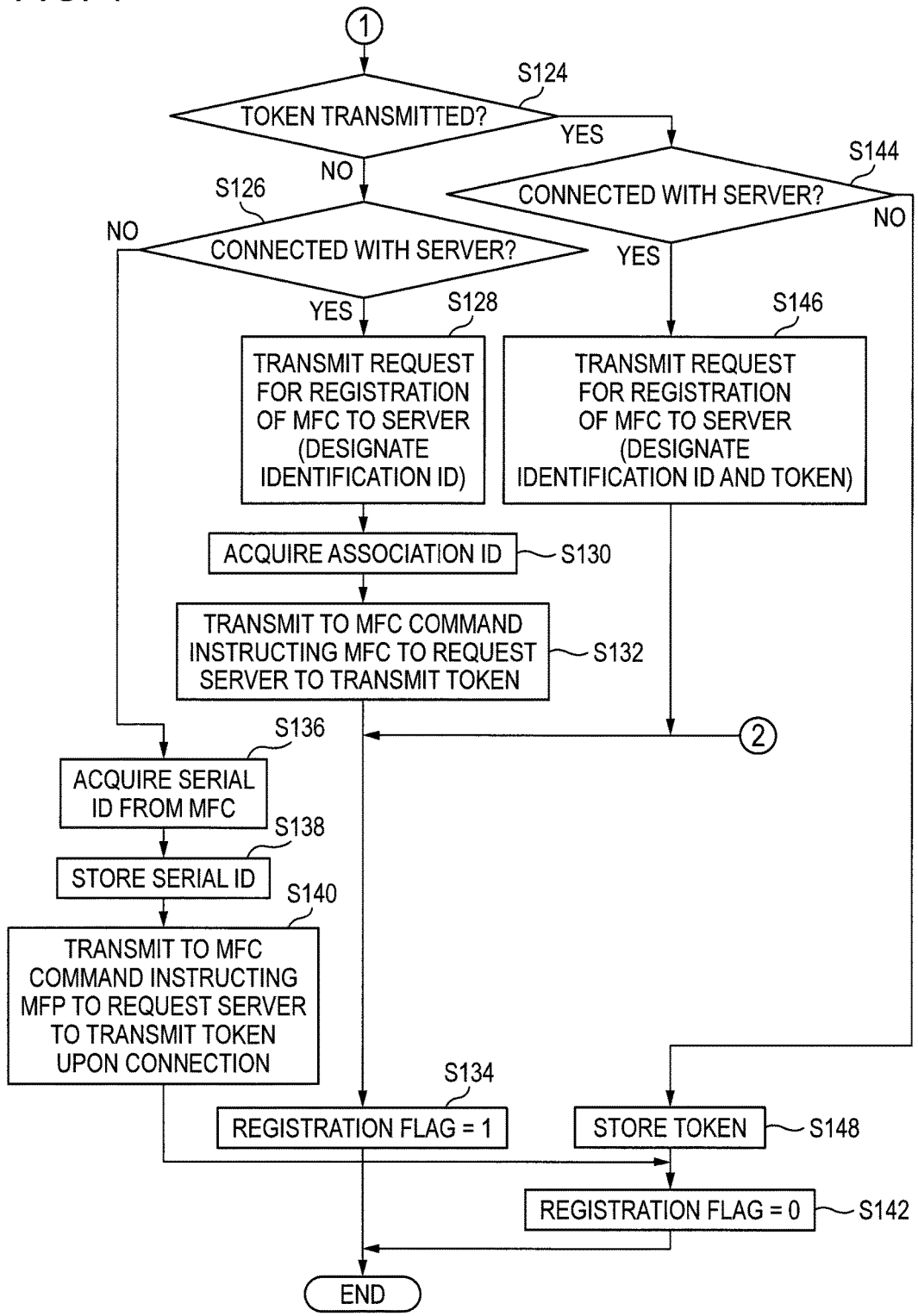
FIG. 4 is a flowchart illustrating operations of the PC.

In recent years, a command, image data and the like can be transmitted and received between a PC and a device through a cloud service provided on a web. By using the cloud service, even when any one of the PC and the device exists at an outside of an intranet, a command, image data and the like can be transmitted and received between the PC and the device, which is convenient. In order to use the cloud service, it is required to prepare an account for the cloud service from the PC and to register the account information in the device, which is a burden on a user. However, according to the communication system 1, when installing a device driver of the MFP 50 or MFP 51 in the PC 10 or PC 11, a registration for the cloud service such as the preparation of the account is automatically made. In the below, the driver install of the MFP 50 into the PC 10 and the registration for the cloud service will be specifically described with reference to a sequence diagram shown in FIG. 2.

First, when the control program 32 is executed, a driver program of the MFP 50 is installed (M100). Then, a request, which instructs the MFP 50 and devices other than the MFP 50 to transmit device information of respective devices, specifically, a node name and a MAC address to the PC 10, is transmitted to the MFP 50 and devices other than the MFP 50 connected to the PC 10 through the wireless communication 40 (M102). The MFP 50 and devices other than the MFP 50 transmit each device information to the PC 10, as a reply to the request for transmission (M104).

When the PC 10 receives the device information of the MFP 50 and devices other than the MFP 50, the PC 10 displays the MFP 50 and devices other than the MFP 50 corresponding to the received device information on the panel 22. Then, a user selects any device, in this case, the MFP 50 from the MFP 50 and devices other than the MFP 50 displayed on the panel 22. When the MFP 50 is selected, the PC 10 prepares port information (an example of the communication identification information of this disclosure) on the basis of the device information of the selected device, i.e., the MFP 50 and stores the same in the data storage area 34 (M106). The device corresponding to the port information, i.e., the MFP 50 and the installed driver are associated, and the PC 10 can perform a printing, scan, Fax operations and the like by using the MFP 50. Meanwhile, in the case of a configuration where the MFP 50 is not provided with the IP address from the DHCP server but stores therein a fixed IP address, the IP address may be the port information. In this case, the PC 10 may read out the IP address from a header area of a packet received from the MFP 50.

Subsequently, the PC 10 executes the control program 32 to transmit a request, which instructs the web server 46 to transmit identification ID (an example of the identification information of this disclosure) for identifying the PC 10 to the PC 10, to the web server 46 (M108). When the web server 46 receives the request for transmission of the identification ID, the web server 46 issues identification information specific to the PC 10, i.e., identification ID that is not to be transmitted to the other PCs and the like (M110). Then, the web server 46 transmits the issued identification ID to the PC 10 (M112). For reference, the web server 46 is a server for the cloud service.

When the PC 10 receives the identification ID, the PC 10 stores the identification ID in the data storage area 34 and sets so that it can be referred to by the driver (M114). Then, the PC 10 designates the received identification ID and transmits a request for registration of the MFP 50 to the web server 46 (M116). When the web server 46 receives the request for registration of the MFP 50 having the received identification ID designated therein, the web server 46 transmits an association ID (an example of the token acquisition information of this disclosure) associated with the identification ID to the PC 10 (M118). Then, the PC 10 designates the received association ID and transmits a command, which instructs the MFP 50 to acquire a token from the web server 46, to the MFP 50 (M120). That is, the PC 10 transmits the association ID to the MFP 50 and also transmits the command, which instructs the MFP 50 to acquire a token from the web server 46 by using the association ID, to the MFP 50. In the meantime, when transmitting the command and the like from the PC 10 to the MFP 50, the port information generated upon the device install of the MFP 50 is used. Also, the token is necessary to perform communication between the MFP 50 and the web server 46 and means a security token of an authentication support.

When the MFP 50 receives the command to acquire a token, the MFP 50 designates the received association ID and transmits a request, which instructs the web server 46 to transmit a token to the MFP 50, to the web server 46 (M122). When the web server 46 receives the request for transmission of a token, the web server 46 issues a token and associates the token and the identification ID (M124). Specifically, the web server 46 extracts an identification ID associated with the designated association ID from the MFP 50. Then, the web server 46 associates and stores the identification ID and the issued token. Subsequently, the web server 46 transmits the token associated with the identification ID to the MFP 50 (M126). When the MFP 50 receives the token, the MFP 50 stores the token in the data storage area 74 (M128).

Thereby, the identification ID necessary to perform data communication and the like between the PC 10 and the web server 46 is stored in the PC 10 and the token necessary to perform data communication and the like between the MFP 50 and the web server 46 is stored in the MFP 50. The identification ID and the token are stored with being associated in the web server 46. Thus, even when the PC 10 is connected to the access point 48 at the outside of the LAN 49, for example, it is possible to transmit and receive data and the like between the PC 10 and the MFP 50 through the web server 46.

Specifically, when printing an image based on the image data stored in the data storage area 34 of the PC 10 by the printer 60 of the MFP 50, for example, the PC 10 transmits a printing instruction to the web server 46 (M130). At this time, the identification ID is used to permit the printing instruction to be transmitted from the PC 10 to the web server 46. In the meantime, the printing instruction to be transmitted to the web server 46 includes image data of a printing target and information for specifying a device, i.e., the MFP 50, to execute a printing operation.

When the web server 46 receives the printing instruction from the PC 10, the web server 46 transmits the printing instruction to the device specified by the information included in the printing instruction, i.e., the MFP 50 (M132). At this time, since the token is associated with the identification ID used upon the data communication with the PC 10, the transmission and reception of the data between the web server 46 and the MFP 50 is allowed. Then, the MFP 50 transmits a request for transmission of the image data of the printing target to the web server 46 (M134). The web server 46 transmits the image data transmitted from the PC 10 to the MFP 50, in response to the request for transmission (M136). Thereby, the MFP 50 receives the image data and performs a printing operation of an image based on the image data by the printer 60 (M138).

In this way, the control program 32 is executed in the PC 10, so that the driver of the MFP 50 is installed. In addition, the identification ID stored in the PC 10 and the token stored in the MFP 50 are stored with being associated in the web server 46. Thereby, as described above, it is possible to transmit and receive the command, the image data and the like between the PC 10 and the MFP 50 through the web server 46. That is, the registration for the cloud service can be automatically made upon the driver install of the MFP 50, so that it is possible to reduce a burden on the user.

Also, when installing the driver in the PC 10, the data communication between the PC 10 and the web server 46 may be impossible in some cases. In this case, the acquisition of the identification ID is performed after the install of the driver is completed and then the data communication between the PC 10 and the web server 46 becomes possible. That is, a state of the data communication between the PC 10 and the web server 46 is checked every predetermined interval after the install of the driver is completed, and the acquisition of the identification ID is performed at timing at which the data communication between the PC 10 and the web server 46 becomes possible. Thereby, even when the data communication between the PC 10 and the web server 46 is impossible upon the install of the device driver, it is possible to perform the automatic registration for the cloud service after some time elapses.

Also, when the control program 32 is used to install the driver of the MFP 50 in the PC 11 (hereinafter, also referred to as the 'second PC 11') after the control program 32 is used to install the driver of the MFP 50 in the PC 10, the token has been already stored in the data storage area 74 of the MFP 50. For this reason, when the control program 32 is executed in the second PC 11, the data communication between the second PC 11 and the MFP 50 is performed using the token stored in the data storage area 74.

Specifically, when the token is stored in the data storage area 74 of the MFP 50, a request, which instructs the MFP 50 to transmit the corresponding token to the second PC 11, is transmitted from the second PC 11 to the MFP 50. When the second PC 11 receives the token, the second PC 11 transmits the token to the web server 46 and also transmits a request, which instructs the web server 46 to transmit the identification ID stored with being associated with the token to the second PC 11, to the web server 46. When the second PC 11 receives the identification ID, as a reply to the request for transmission, the second PC 11 stores the received identification ID in the data storage area 34 and can perform data communication with the web server 46 by using the identification ID. That is, the second PC 11 can perform data communication with the MFP 50 through the web server 46 by using the identification information and token set in the PC 10 and MFP 50. Thereby, the second PC 11 can perform data communication with the MFP 50 through the web server 46 without making the registration for the cloud service.

Also, even when the second PC 11 acquires the identification ID set in the PC 10 from the web server 46, the second PC 11 can acquire a new identification ID, i.e., an identification ID, which is not set for the other PCs and the like, from the web server 46 and associate and store the new identification ID and the token acquired from the MFP 50 in the web server 46. Specifically, the second PC 11 transmits a request for transmission of a new identification ID to the web server 46 and acquires a new identification ID from the web server 46. Then, the second PC 11 transmits a command, which instructs the web server 46 to associate and store therein the new identification ID and the token acquired from the MFP 50, to the web server 46. Thereby, it is possible to make the registration for the cloud service by using the unique identification ID of the second PC 11.

Also, when the control program 33 is used to install the driver of the MFP 51 (hereinafter, also referred to as the 'second MFP 51') in the PC 10 after the control program 32 is used to install the driver of the MFP 50 in the PC 10, the identification ID has been already stored in the data storage area 34 of the PC 10. For this reason, in this case, when the control program 33 is executed in the PC 10, the data communication between the PC 10 and the second MFP 51 is performed using the identification ID stored in the data storage area 34. That is, when the identification ID is stored in the data storage area 34 of the PC 10, the PC 10 makes the registration for the cloud service by using the identification ID stored in the data storage area 34 without transmitting a request for transmission of a new identification ID to the web server 46. Thereby, even when the drivers of the plurality of devices are installed in one PC, it is possible to prevent a plurality of identification IDs from being set in one PC.

Also, when the identification ID is stored in the data storage area 34 of the PC 10, the data communication between the PC 10 and the web server 46 may be impossible in some cases. In this case, a serial ID (an example of the device-specific information of this disclosure) specific to a device that is an install target of a driver is acquired. After acquiring the serial ID, the serial ID and the identification ID are stored with being associated in the web server 46 at timing at which the data communication with the web server 46 becomes possible, and the web server 46 issues a token by using the stored information.

Specifically, when the identification ID is stored in the data storage area 34 of the PC 10, the control program 33 is executed, and the PC 10 transmits a request, which instructs the second MFP 51 to transmit a serial ID of the second MFP 51 to the PC 10, to the second MFP 51 if the data communication between the PC 10 and the web server 46 is impossible. The second MFP 51 transmits the serial ID thereof to the PC 10, as a reply to the request for transmission. Also, the PC 10 transmits a command, which instructs the second MFP 51 to transmit to the web server 46 a request for transmission of a token having a serial ID designated therein to the second MFP 51, to the second MFP 51. Receiving the command, the second MFP 51 designates a serial ID and transmits a request, which instructs the web server 46 to transmit a token to the second MFP 51, to the web server 46. The web server 46 prepares a token associated with the serial ID and transmits the same to the second MFP 51, as a reply to the request for transmission of a token. When the second PC 11 receives the token, the second PC 11 stores the token in the data storage area 74.

Also, the PC 10 transmits a command, which instructs the web server 46 to associate and store the identification ID stored in the data storage area 34 and the received serial ID, to the web server 46 at timing at which the data communication with the web server 46 becomes possible. The web server 46 specifies the serial ID associated with the token transmitted to the second MFP 51 and specifies the identification ID stored with being associated with the corresponding serial ID. Then, the web server 46 associates and stores the identification ID and the token transmitted to the second MFP 51. Thereby, the identification ID stored in the data storage area 34 of the PC 10 and the token stored in the data storage area 74 of the second MFP 51 are stored with being associated in the web server 46. That is, the registration for the cloud service is completed.

In the meantime, the processing where the PC 10 transmits the command instructing the web server 46 to associate and store the received serial ID to the web server 46 may be performed before the processing where the second MFP 51 transmits the request for the token ID associated with the serial ID to the web server 46. In this way, the serial ID of the driver is acquired between the PC 10 and the web server 46 and the serial ID and the identification ID are stored with being associated in the web server 46, so that the registration for the cloud service can be made. Thereby, even when the data communication between the web server 46 and the PC 10 becomes impossible during the driver install, it is possible to associate the web server 46 and the PC 10 at timing at which the communication becomes possible.

<Control Program>

The install of the device driver of the MFP 50 or MFP 51 and the registration for the cloud service are made by the execution of the control program 32 or control program 33 of the CPU 12 of the PC 10 or PC 11. Since the execution of the control programs 32, 33 of the CPU 12 of the PC 10 and the execution of the control programs 32, 33 of the CPU 12 of the PC 11 are the same, a flow is described when the control program 32 is executed in the CPU 12 of the PC 10 with reference to FIGS. 3 to 6.

In the control program 32, a driver program is first installed (S100). Then, a request for transmission of device information is transmitted to devices connected to the PC 10 (S102). The devices corresponding to the received device information are displayed on the panel 22 (S104). Subsequently, the CPU 12 determines whether any device, in this illustrative embodiment, the MFP 50 is selected from the devices displayed on the panel 22 (S106). In a case where any device is not selected (NO in S106), the processing of S106 is repeated. On the other hand, in a case where any device is selected (YES in S106), the port information is generated on the basis of the device information of the selected device and is then stored in the data storage area 34 (S108).

Subsequently, the CPU 12 determines whether the identification ID is stored in the data storage area 34 (S110). In a case where the identification ID is not stored in the data storage area 34 (NO in S110), a request for transmission of a token to the PC 10 is transmitted to the MFP 50 (S112). Then, the CPU 12 determines whether the data communication with the web server 46 can be performed (S114). In a case where the data communication with the web server 46 can be performed (YES in S114), the CPU 12 determines whether a token is transmitted from the MFP 50 (S116).

In a case where a token is not transmitted from the MFP 50 (NO in S116), a request for transmission of a new identification ID to the PC 10 is transmitted to the web server 46 (S118). Then, a new identification ID is acquired, as a reply to the request for transmission of a new identification ID (S120). Then, the acquired new identification ID is stored in the data storage area 34 and is set so that it can be referred to by the driver (S122). Subsequently, the CPU 12 determines whether a token is transmitted from the MFP 50 (S124). On the other hand, in a case where it is determined in S114 that the data communication with the web server 46 cannot be performed (NO in S114), the processing of S116 to S122 is skipped over and the processing of S124 is performed.

In a case where a token is not transmitted from the MFP 50 (NO in S124), the CPU 12 determines whether the data communication with the web server 46 can be performed (S126). In a case where the data communication with the web server 46 can be performed (YES in S126), an identification ID is designated and a request, which instructs the web server 46 to register therein the MFP 50, is transmitted to the web server 46 (S128). As a reply of the request for registration, an association ID is acquired from the web server 46 (S130). Then, the association ID is transmitted to the MFP 50 and a command, which instructs the MFP 50 to request the web server 46 to transmit the token associated with the association ID to the MFP 50, is transmitted to the MFP 50 (S132). Then, a registration flag is set as '1' (S134). By the above processing, the control program 32 is once halted.

Also, in a case where it is determined in S126 that the data communication with the web server 46 cannot be performed (NO in S126), a serial ID is acquired from the MFP 50 (S136). Then, the acquired serial ID is stored in the data storage area 34 (S138). Subsequently, when the data communication between the MFP 50 and the web server 46 becomes possible, a command, which instructs the MFP 50 to request the web server 46 to transmit a token to the MFP 50, is transmitted to the MFP 50 (S140). Then, the registration flag is set as '0' (S142). By the above processing, the control program 32 is once halted.

Also, in a case where it is determined in S124 that a token is transmitted from the MFP 50 (YES in S124), the CPU 12 determines whether the data communication with the web server 46 can be performed (S144). In a state where the data communication with the web server 46 can be performed (YES in S144), an identification ID and a token are designated and a request, which instructs the web server 46 to register therein the MFP 50, is transmitted to the web server 46 (S146). Then, the processing of S134 and thereafter is performed. Meanwhile, the data communication with the web server 46 can not be performed (YES in S144), the token is stored in the data storage area 34 (S148).

Then the processing of S142 and thereafter is performed.

Also, in a case where it is determined in S116 that a token is transmitted from the MFP 50 (YES in S116), a request for transmission of an identification ID associated with the corresponding token to the PC 10 is transmitted to the web server 46 (S150). As a reply to the request for transmission, an identification ID associated with the token is acquired (S152). Then, the CPU 12 determines whether or not to make a registration for the cloud service by using the acquired identification ID (S154). That is, a notice indicating whether or not to select the acquired identification ID is displayed on the panel 22 and the like and the CPU 12 determines whether or not to make a registration for the cloud service in accordance with a selection result of the user. In a case where the acquired identification ID is not to be used (NO in S154), the processing of S118 and thereafter is performed. On the other hand, in a case where the acquired identification ID is to be used (YES in S154), the acquired identification ID is stored in the data storage area 34 and is set so that it can be referred to by the driver (S156). Then, the processing of S134 and thereafter is performed.

Also, in a case where it is determined in S110 that the identification ID is stored in the data storage area 34 (YES in S110), the stored identification ID is set so that it can be referred to by the driver (S158). Then, the processing of S124 and thereafter is performed.

Figure 5:
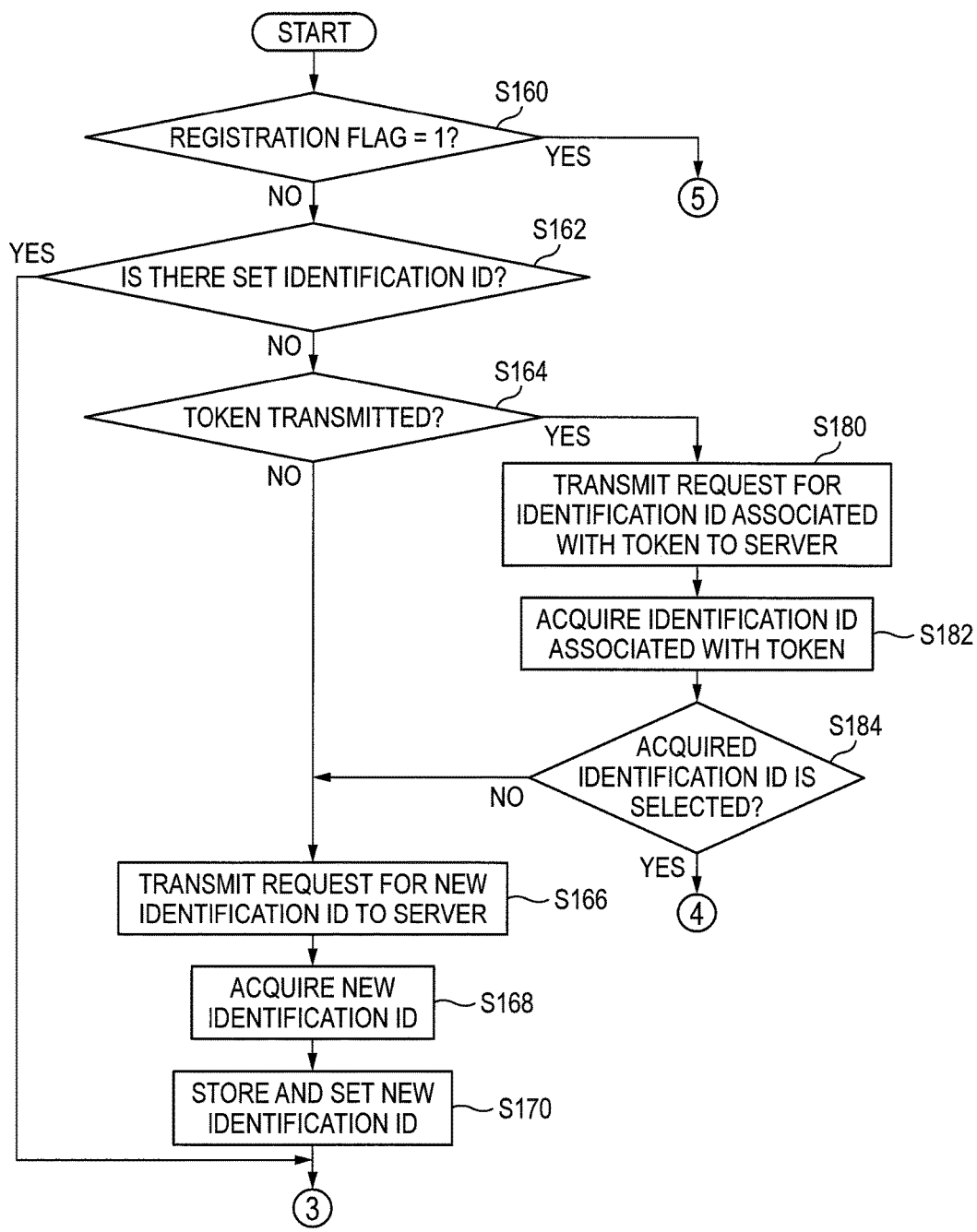
FIG. 5 is a flowchart illustrating operations of the PC.
Figure 6:
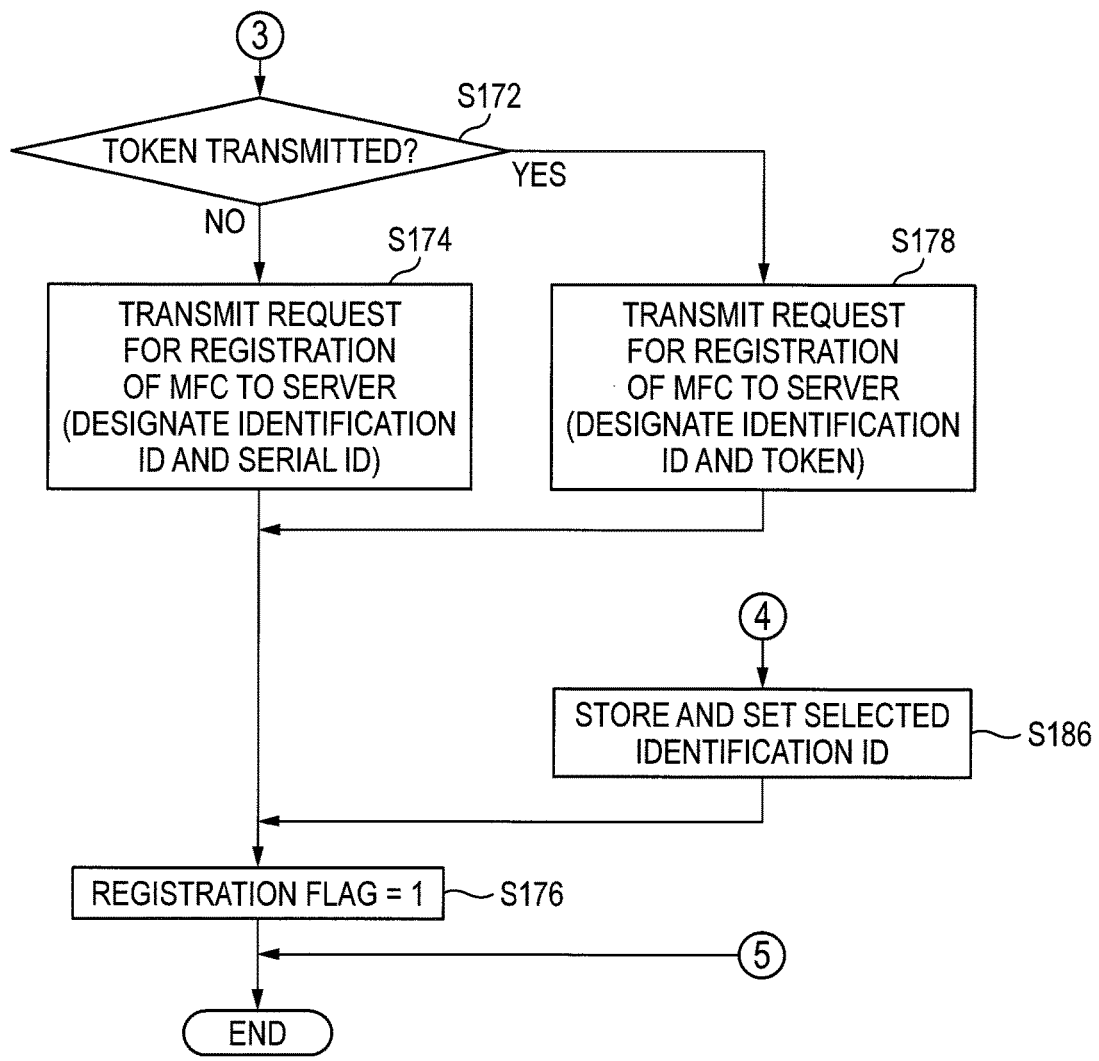
FIG. 6 is a flowchart illustrating operations of the PC.

Also, when the printing command, the scan command, the facsimile transmission command and the like for the MFP 50 are transmitted from the PC 10 to the web server 46, a flow shown in FIGS. 5 and 6 is resumed. Specifically, when a command is transmitted from the PC 10 to the web server 46, the CPU 12 determines whether the registration flag is set as '1' (S160). In a case where the registration flag is set as '1' (YES in S160), the control program 32 is terminated. On the other hand, in a case where the registration flag is not set as '1' (NO in S160), the CPU 12 determines whether there is the set identification ID (S162). In a case where there is no set identification ID (NO in S162), the CPU 12 determines whether a token is transmitted from the MFP 50 (S164).

In a case where a token is not transmitted from the MFP 50 (NO in S164), a request for transmission of a new identification ID to the PC 10 is transmitted to the web server 46 (S166). Then, as a reply to the request for transmission of a new identification ID, a new identification ID is acquired (S168). Then, the acquired identification ID is stored in the data storage area 34 and is set so that it can be referred to by the driver (S170). Subsequently, the CPU 12 determines whether a token is transmitted from the MFP 50 (S172). On the other hand, in a case where it is determined in S162 that there is a set identification ID (YES in S162), the processing of S164 to S170 is skipped over and the processing of S172 is performed.

In a case where a token is not transmitted from the MFP 50 (NO in S172), an identification ID and a serial ID are designated and a request, which instructs the web server 46 to register therein the MFP 50, is transmitted to the web server 46 (S174). Then, the registration flag is set as '1' (S176) and the control program 32 is terminated. On the other hand, in a case where a token is transmitted from the MFP 50 (YES in S172), an identification ID and a token are designated and a request, which instructs the web server 46 to register therein the MFP 50, is transmitted to the web server 46 (S178). Then, the registration flag is set as '1' (S176) and the control program 32 is terminated.

Also, in a case where it is determined in S164 that a token is transmitted from the MFP 50 (YES in S164), a request for transmission of an identification ID associated with the corresponding token to the PC 10 is transmitted to the web server 46 (S180). As a reply to the request for transmission, an identification ID associated with the token is acquired (S182). Then, the CPU 12 determines whether or not to make a registration for the cloud service by using the acquired identification ID (S184). That is, a notice indicating whether or not to select the acquired identification ID is displayed on the panel 22 and the like and the CPU 12 determines whether or not to make a registration for the cloud service in accordance with a selection result of the user. In a case where the acquired identification ID is not to be used (NO in S184), the processing of S166 and thereafter is performed. On the other hand, in a case where the acquired identification ID is to be used (YES in S184), the acquired identification ID is stored in the data storage area 34 and is set so that it can be referred to by the driver (S186). Then, the processing of S176 and thereafter is performed.

Figure 7:
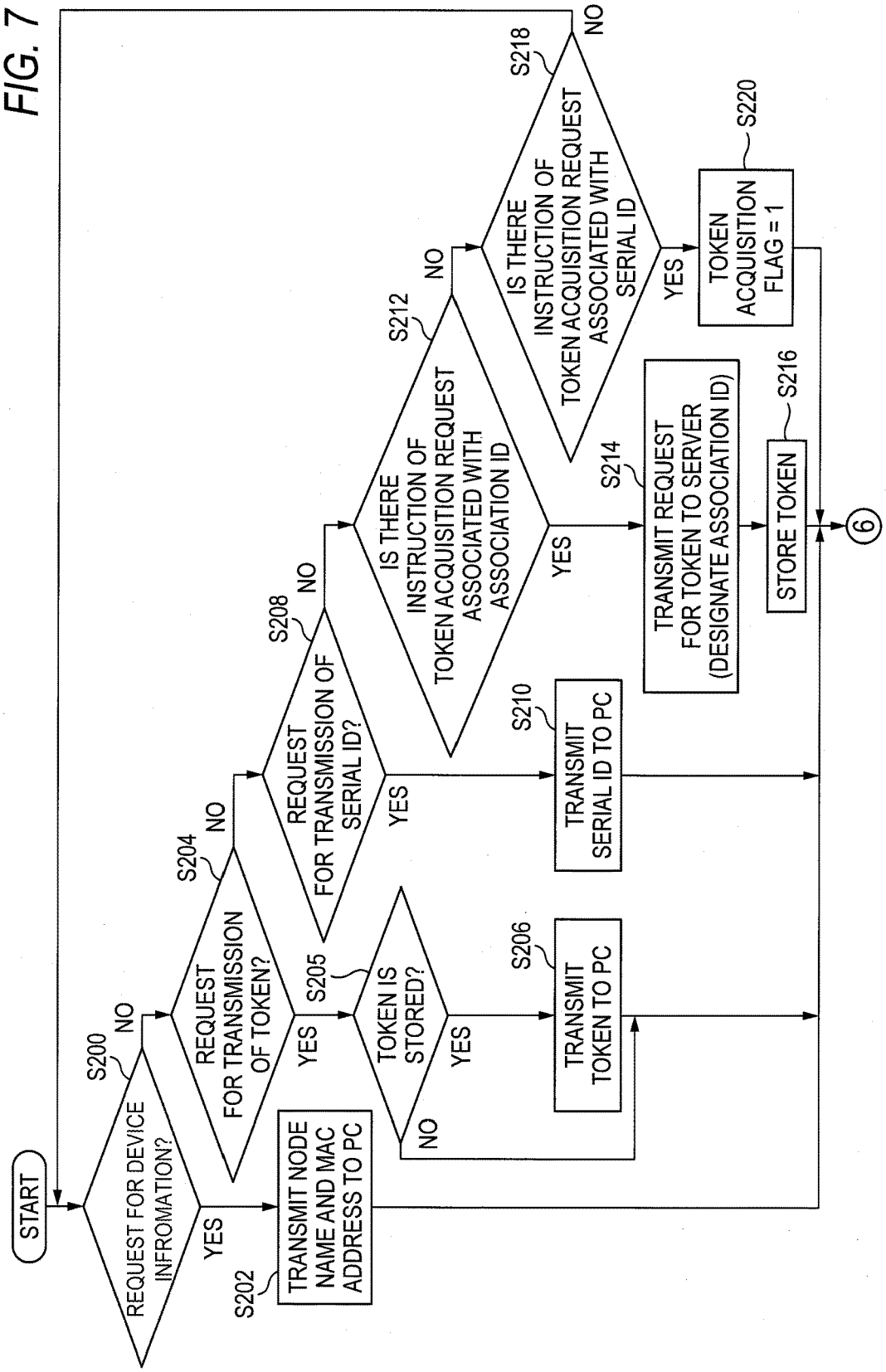
FIG. 7 is a flowchart illustrating operations of an MFP.
Figure 8:
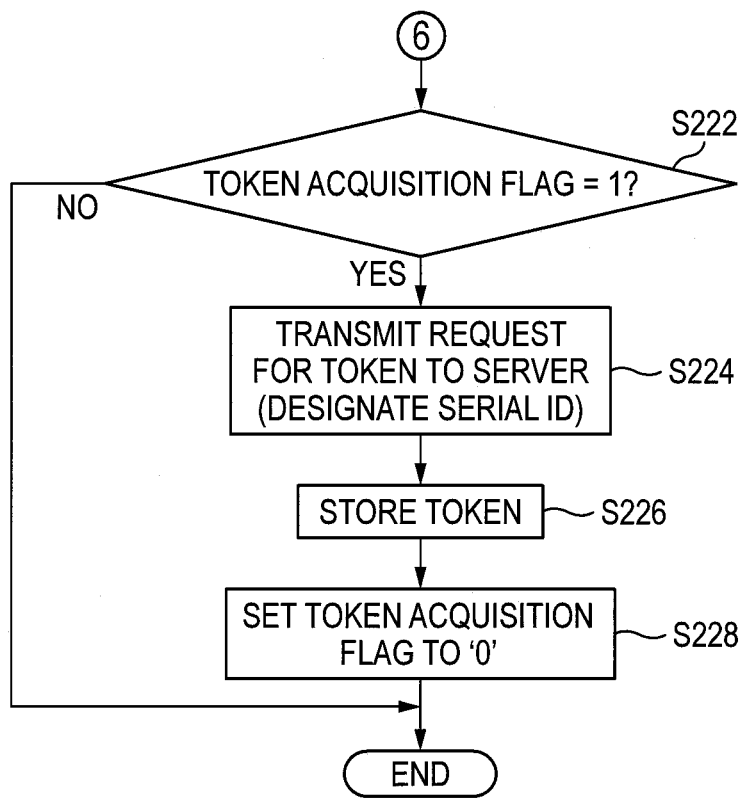
FIG. 8 is a flowchart illustrating operations of the MFP.

Also, when the control program 32 is executed and the install of the device driver of the MFP 50 and the registration for the cloud service are made in the PC 10, the control program 72 is executed in the MFP 50. In the below, a flow is described when the control program 72 is executed with reference to FIGS. 7 and 8.

In the control program 72, the CPU 52 determines whether a request for transmission of the device information to the PC 10 is received (S200). In a case where the request for transmission of the device information is received (YES in S200), a node name and a MAC address are transmitted to the PC 10 (S202). Then, the CPU 52 determines whether a token acquisition flag is set as '1' (S222). In a case where the token acquisition flag is set as '1' (YES in S222), a request for transmission of a token associated with the serial ID to the MFP 50 is transmitted to the web server 46 (S224). As a reply to the request for transmission, a token is acquired and the acquired token is stored in the data storage area 74 (S226). Subsequently, the token acquisition flag is set as '0' (S228). Then, the control program 72 is terminated. On the other hand, in a case where the token acquisition flag is not set as '1' (NO in S222), the processing of S224 and S226 is skipped over and the control program 72 is terminated.

Also, in a case where it is determined in S200 that the request for transmission of the device information is not received (NO in S200), the CPU 52 determines whether a request for transmission of a token to the PC 10 is received (S204). In a case where the request for transmission of a token is received (YES in S204), the CPU 52 determines whether the token is stored in the data storage area 74 (S205). In a case where the token is stored in the data storage area 74 (YES in S205), the token is transmitted to the PC 10 (S206). Then, the processing after S220 is performed. On the other hand, in a case where the token is not stored in the data storage area 74 (NO in S205), the processing of S206 is skipped over and the processing of S222 and thereafter is performed.

Also, in a case where it is determined in S204 that the request for transmission of a token is not received (NO in S204), the CPU 52 determines whether a request for transmission of a serial ID to the PC 10 is received (S208). In a case where the request for transmission of a serial ID is received (YES in S208), the serial ID is transmitted to the PC 10 (S210). Then, the processing of S222 and thereafter is performed.

On the other hand, in a case where the request for transmission of a serial ID is not received (NO in S208), the CPU 52 determines whether a command to transmit to the web server 46 the request for transmission of a token associated with an association ID to the MFP 50 is received (S212). In a case where the transmission command to the web server 46 is received (YES in S212), a request for transmission of a token associated with the association ID to the MFP 50 is transmitted to the web server 46 (S214). As a reply to the request for transmission, a token is acquired and the acquired token is stored (S216). Then, the processing of S222 and thereafter is performed.

On the other hand, in a case where the command to transmit a token associated with an association ID to the web server 46 is not received (NO in S212), the CPU 52 determines whether a command to transmit to the web server 46 a request for transmission of a token associated with an serial ID to the MFP 50 is received (S218). In a case where the transmission command to the web server 46 is not received (NO in S218), the control program returns to S200. On the other hand, in a case where the transmission command to the web server 46 is received (YES in S218), the token acquisition flag is set as '1' (S220). Then, the processing of S222 and thereafter is performed.

Figure 9:
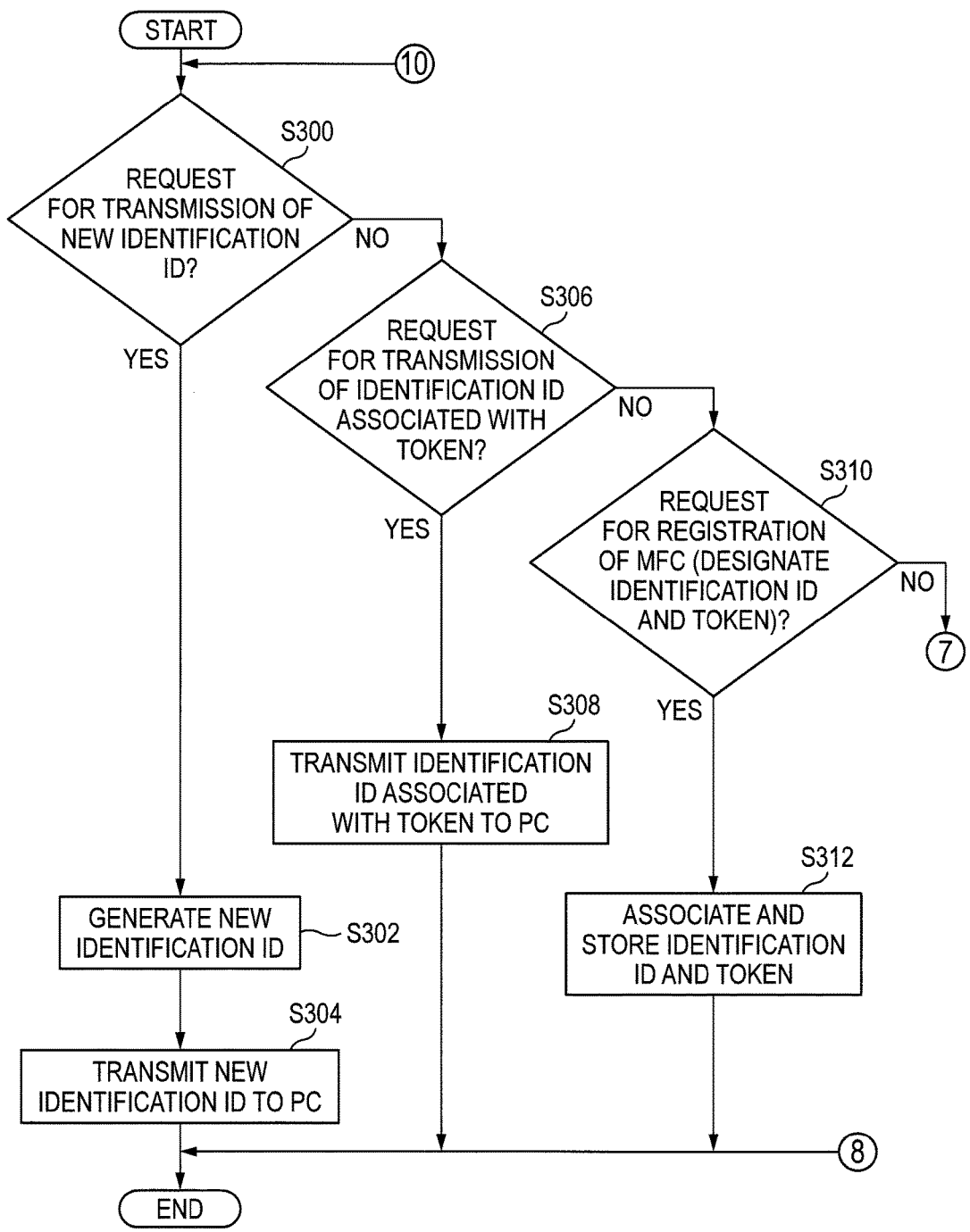
FIG. 9 is a flowchart illustrating operations of a web server.
Figure 10:
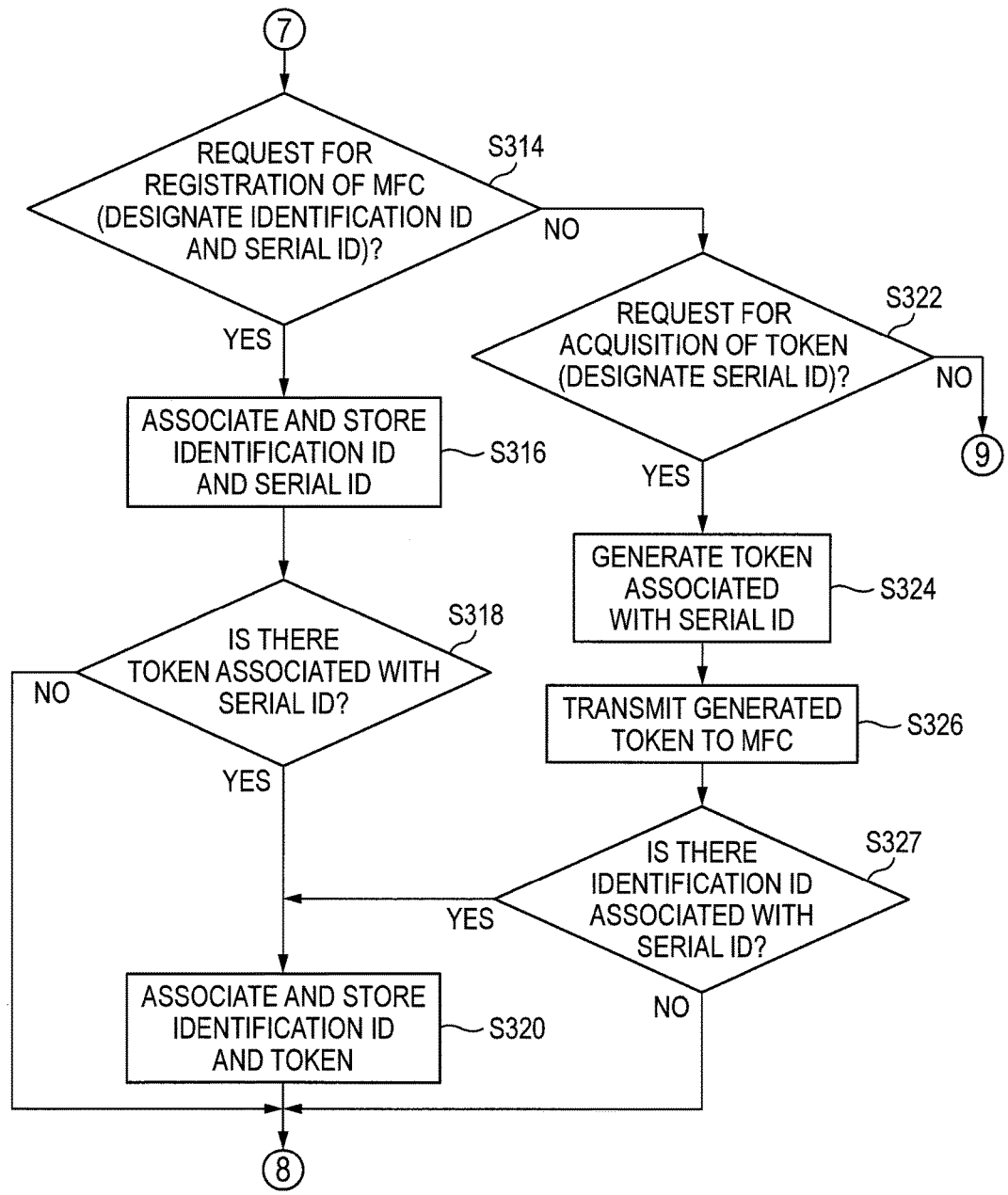
FIG. 10 is a flowchart illustrating operations of the web server.
Figure 11:
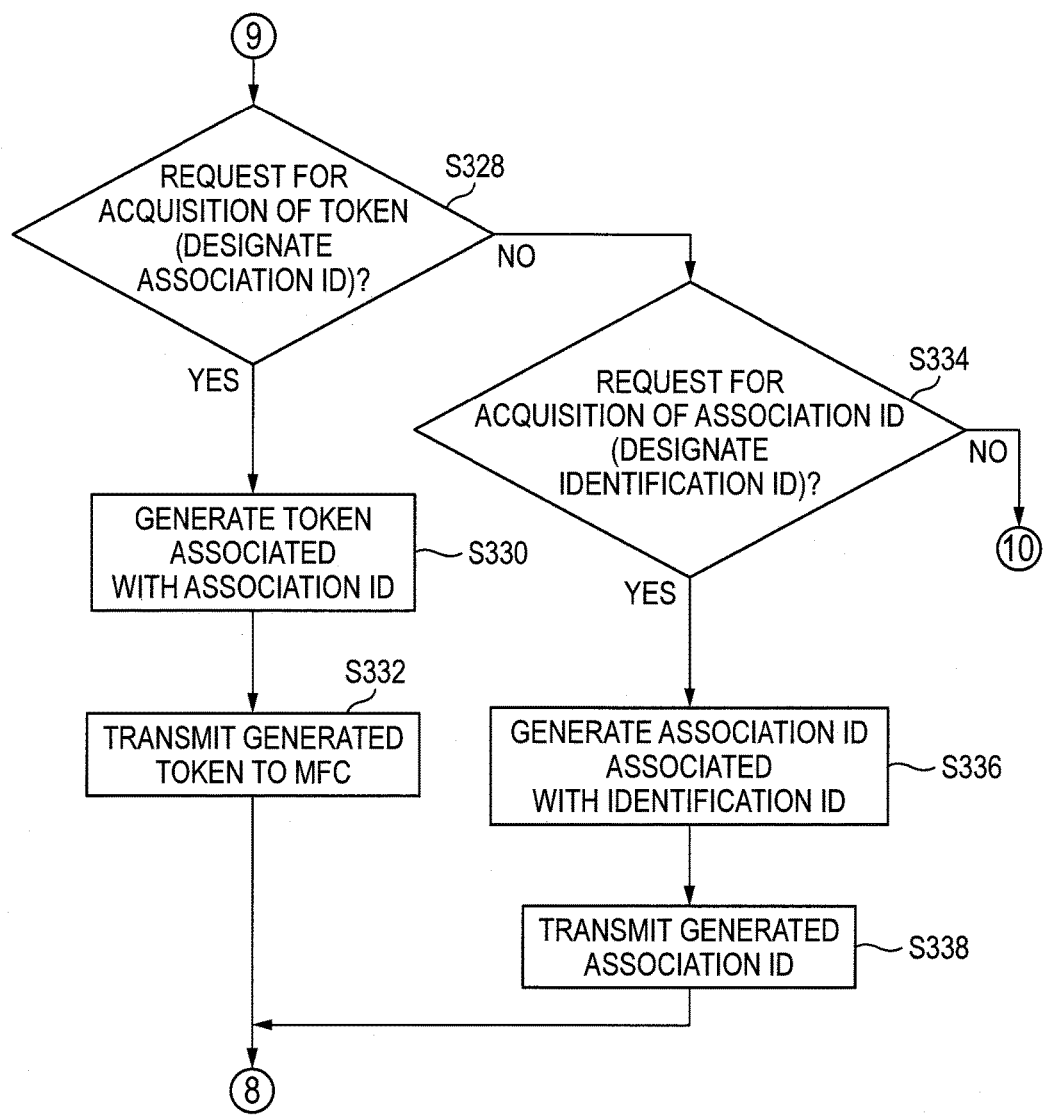
FIG. 11 is a flowchart illustrating operations of the web server.

Also, when the control program 32 is executed and the install of the device driver of the MFP 50 and the registration for the cloud service are made in the PC 10, a control program (not shown) is executed in the web server 46. In the below, a flow is described when the control program is executed with reference to FIGS. 9 to 11.

First, in the control program of the web server 46, the CPU of the web server 46 determines whether a request for transmission of a new identification ID to the PC 10 is received (S300). In a case where the request for transmission of a new identification ID is received (YES in S300), a new identification ID is generated (S302). Then, the generated new identification ID is transmitted to the PC 10 (S304). Then, the control program of the web server 46 is terminated.

On the other hand, in a case where the request for transmission of a new identification ID is not received (NO in S300), the CPU of the web server 46 determines whether a request for transmission of an identification ID associated with a token to the PC 10 is received (S306). In a case where the request for transmission of an identification ID associated with a token to the PC 10 is received (YES in S306), an identification ID associated with the token is transmitted to the PC 10 (S308). Then, the control program of the web server 46 is terminated.

On the other hand, in a case where the request for transmission of an identification ID associated with a token is not received (NO in S306), the CPU of the web server 46 determines whether a request for registration of the MFP 50 having designated the identification ID and token is received (S310). In a case where the request for registration of the MFP 50 having designated the identification ID and token is received (YES in S310), the identification ID and the token are stored with being associated (S312). Then, the control program of the web server 46 is terminated.

On the other hand, in a case where the request for registration of the MFP 50 having designated the identification ID and token is not received (NO in S310), the CPU of the web server 46 determines whether a request for registration of the MFP 50 having designated the identification ID and serial ID is received (S314). In a case where the request for registration of the MFP 50 having designated the identification ID and serial ID is received (YES in S314), the identification ID and the serial ID are stored with being associated (S316). Then, the CPU of the web server 46 determines whether there is a token associated with the serial ID (S318). In a case where there is a token associated with the serial ID (YES in S318), the identification ID and the token are stored with being associated (S320). Then, the control program of the web server 46 is terminated. On the other hand, in a case where there is no token associated with the serial ID (NO in S318), the processing of S320 is skipped over and the control program of the web server 46 is terminated.

Also, in a case where it is determined in S314 that the request for registration of the MFP 50 having designated the identification ID and serial ID is not received (NO in S314), the CPU of the web server 46 determines whether a request for transmission of a token associated with the serial ID to the MFP 50 is received (S322). In a case where the request for transmission of a token associated with the serial ID is received (YES in S322), a token associated with the serial ID is generated (S324). Then, the generated token is transmitted to the MFP 50 (S326). Then, the CPU of the web server 46 determines whether there is an identification ID associated with the serial ID (S327). In a case where there is an identification ID associated with the serial ID (YES in S327), the processing of S320 and thereafter is performed. On the other hand, in a case where there is no identification ID associated with the serial ID (NO in S327), the control program of the web server 46 is terminated.

In a case where it is determined in S322 that the request for transmission of a token associated with the serial ID is not received (NO in S322), the CPU of the web server 46 determines whether a request for transmission of a token associated with the association ID to the MFP 50 is received (S328). In a case where the request for transmission of a token associated with the association ID is received (YES in S328), a token associated with the association ID is generated (S330). Then, the generated token is transmitted to the MFP 50 (S332). Then, the control program of the web server 46 is terminated.

On the other hand, in a case where the request for transmission of a token associated with the association ID is not received (NO in S328), the CPU of the web server 46 determines whether a request for transmission of an association ID associated with the identification ID to the PC 10 is received (S334). In a case where the request for transmission of an association ID associated with the identification ID is not received (NO in S334), the control program returns to S300. On the other hand, in a case where the request for transmission of an association ID associated with the identification ID is received (YES in S334), an association ID associated with the identification ID is generated (S336). Then, the generated association ID is transmitted to the PC 10 (S338). Then, the control program of the web server 46 is terminated.

<Functional Configurations of CPU>

It can be though that the CPU 12 configured to execute the control program 32 of the PC 10 has the functional configurations as shown in FIG. 1, considering the execution processing thereof. As can be seen from FIG. 1, the CPU 12 is provided with an install unit 100, an identification information acquisition unit 102, a token-related information acquisition unit 104, a storage control unit 106, a device-specific information acquisition unit 108, a first device transmission unit 110, a second device transmission unit 112, a first server machine transmission unit 114 and a second server machine transmission unit 116. Also, the install unit 100 is provided with a driver program storing unit 118 and a communication identification information storing unit 120.

The install unit 100 is a functional unit configured to execute the processing of S100 to S108 of the control program 32. The identification information acquisition unit 102 is a functional unit configured to execute the processing of S120, S152, S168 and S182 of the control program 32. The token-related information acquisition unit 104 is a functional unit configured to execute the processing of S130 of the control program 32. The storage control unit 106 is a functional unit configured to execute the processing of S122, S156, S170 and S186 of the control program 32. The acquiring the device-specific information 108 is a functional unit configured to execute the processing of S136 of the control program 32. The first device transmission unit 110 is a functional unit configured to execute the processing of S132 of the control program 32. The second device transmission unit 112 is a functional unit configured to execute the processing of S140 of the control program 32. The first server machine transmission unit 114 is a functional unit configured to execute the processing of S146 and S178 of the control program 32. The second server machine transmission unit 116 is a functional unit configured to execute the processing of S174 of the control program 32. The driver program storing unit 118 is a functional unit configured to execute the processing of S100 of the control program 32. The communication identification information storing unit 120 is a functional unit configured to execute the processing of S108 of the control program 32.

Also, it can be thought that the CPU 52 configured to execute the control program 72 of the MFP 50 has the functional configurations as shown in FIG. 1, considering the execution processing thereof. As can be seen from FIG. 1, the CPU 52 is provided with a communication control unit 122. The communication control unit 122 is a functional unit configured to execute the processing of S216 and S226 of the control program 72.

Meanwhile, this disclosure is not limited to the above illustrative embodiment and can be implemented in various aspects in which the illustrative embodiment is variously changed and improved on the basis of a knowledge of one skilled in the art. Specifically, for example, in the above illustrative embodiment, the PCs 10, 11 and the MFPs 50, 51 transmit and receive the data by the wireless communication 40. However, the data can be transmitted and received through a USB cable and the like.

Also, in the above illustrative embodiment, the PCs 10, 11 are adopted as the apparatus configured to install the driver of the device and to make the registration for the cloud service by executing one program. However, a variety of apparatuses, for example a portable terminal such as a smart phone can be also adopted. Also, the MFPs 50, 51 are adopted as the device. However, a variety of apparatuses such as a scanner configured to execute only scan processing and a printer configured to execute only print processing can be adopted.

Also, in the above illustrative embodiment, the MFP 50 is configured to acquire the token from the web server 46 by using the association ID. However, the MFP 50 can be also configured to acquire the token from the web server 46 through the PC 10 without using the association ID. Specifically, the PC 10 can acquire the token from the web server 46, not the association ID, as a reply to the request (FIG. 2: M116) for registration of the MFP 50 having designated the identification ID. Then, the PC 10 transmits the acquired token to the MFP 50. Thereby, the MFP 50 acquires the token from the web server 46 thought the PC 10.

Also, in the above illustrative embodiment, the processing shown in FIGS. 3 to 6 is executed by the CPU 12. However, the corresponding processing can be also executed by an ASIC or another logical integrated circuit, rather than the CPU 12, or by cooperation of the CPU 12, the ASIC and another logical integrated circuit.

What is claimed is:

1. A non-transitory computer-readable medium having instructions controlling a computer of an information processing apparatus, the instructions, when executed by the computer, controlling the computer to perform operations including:
    installing a printer driver of a printer, the printer being capable of communicating with the information processing apparatus via a local network;
    in response to installing the printer driver, requesting, to a server, to send identification information for identifying the information processing apparatus, the server being capable of communicating with the information processing apparatus via the Internet;
    in response to the request, receiving the identification information for identifying the information processing apparatus from the server;
    sending, to the printer, relation information related to the identification information, the relation information being used by the printer for receiving authentication information from the server, wherein the identification information for identifying the information processing apparatus and authentication information for authenticating the printer are stored in association with each other in the server; and
    after the printer receives the authentication information from the server, sending, to the server, print data for controlling the printer to print via the Internet, the print data being sent from the server to the printer.

2. The non-transitory computer-readable medium having the instructions according to claim 1,
    wherein the device driver is installed by:
    storing a driver program in the storage unit; and
    acquiring communication identification information for communication of a printer capable of performing communication by the communication unit and storing the same in the storage unit, and
    wherein the instructions control the computer to transmit the token or the relation information to the printer at least after the storing the communication identification information for the communication.

3. The non-transitory computer-readable medium having the instructions according to claim 1,
    wherein, to acquire the identification information, the instructions control the computer to perform operations comprising:
    transmitting to the server a request for transmission of identification information, which is not transmitted to another information processing apparatus, to the information processing apparatus; and
    acquiring the identification information, which is not transmitted to another information processing apparatus, from the server, as a reply to the request for transmission.

4. The non-transitory computer-readable medium having the instructions according to claim 3,
    wherein the instructions control the computer to perform operations comprising:
    determining whether the identification information is stored in the storage unit;
    when it is determined that the identification information is not stored in the storage unit, acquiring the identification information;
    when it is determined that the identification information is stored in the storage unit, acquiring the token or the relation information, which are associated with the identification information stored in the storage unit from the server.

5. The non-transitory computer-readable medium having the instructions according to claim 3,
    wherein the instructions control the computer to perform operations comprising:
    determining whether the printer stores therein the token,
    when it is determined that the printer does not store therein the token, transmitting to the server a request for transmission of identification information, which is not transmitted to another information processing apparatus, to the information processing apparatus; and
    when it is determined that the printer stores therein the token:
    transmitting to the server a request for transmission of identification information, which is stored in the server with being associated with the token stored in the printer, and which has been already transmitted to another information processing apparatus from the server, to the information processing apparatus; and
    acquiring identification information, which is stored with being associated with the token in the server and has been already transmitted to another information processing apparatus from the server, from the server, as a reply to the request for transmission.

6. The non-transitory computer-readable medium having the instructions according to claim 3, wherein the instructions control the computer to perform operations comprising:
determining whether the printer stores therein the token,
when it is determined that the printer stores therein the token, transmitting a command, which instructs the server to store therein the identification information, which is acquired by the computer in the acquiring the identification information, and the token stored in the printer, with associating to each other.

7. The non-transitory computer-readable medium having the instructions according to claim 1,
wherein the instructions control the computer to perform operations comprising:
determining whether the communication with the server through the communication unit is possible,
when it is determined that the communication with the server through the communication unit is possible, acquiring the identification information from the server,
when it is determined that the communication with the server through the communication unit is impossible, acquiring the identification information from the server at timing at which communication with the server through the communication unit becomes possible, after the install of the device driver in the installing is terminated.

8. The non-transitory computer-readable medium having the instructions according to claim 1,
wherein the token is necessary to perform communication between the server and the printer, and
wherein the instructions control the computer to perform operations comprising:
determining whether the identification information is stored in the storage unit,
when it is determined that the identification information is not stored in the storage unit, acquiring the identification information;
when it is determined that the identification information is stored in the storage unit, determining whether communication with the server through the communication unit is possible,
wherein the computer performs operations comprising:
when it is determined that the communication with the server through the communication unit is possible, acquiring the token or the relation information, which are associated with the identification information stored in the storage unit from the server; and
when it is determined that the communication with the server through the communication unit is impossible:
acquiring, from the printer, printer-specific information specific to the printer;
transmitting a command, which instructs the printer to transmit a request for transmission of the token to the server, to the printer; and
transmitting a command, which instructs the server to associate and the printer specific information acquired by the acquiring the printer specific information and the identification information stored in the storage unit, to the server.

9. The non-transitory computer-readable medium having the instructions according to claim 8, wherein the identification information stored in the storage unit is one of:
identification information, which is acquired from the server at timing at which the communication with the server through the communication unit becomes possible, when the communication with the server through the communication unit is impossible; and
identification information acquired before the device driver of the printer is installed.

10. An information processing apparatus including a computer, the computer being configured to perform operations including:
installing a printer driver of a printer, the printer being capable of communicating with the information processing apparatus via a local network;
in response to installing the printer driver, requesting, to a server, to send identification information for identifying the information processing apparatus, the server being capable of communicating with the information processing apparatus via the Internet;
in response to the request, receiving the identification information for identifying the information processing apparatus from the server;
sending, to the printer, relation information related to the identification information, the relation information being used by the printer for receiving authentication information from the server, wherein the identification information for identifying the information processing apparatus and authentication information for authenticating the printer are stored in association with each other in the server; and
after the printer receives the authentication information from the server, sending, to the server, print data for controlling the printer to print via the Internet, the print data being sent from the server to the printer.

11. The information processing apparatus including the computer, according to claim 10,
wherein the device driver is installed by:
storing a driver program in the storage unit; and
acquiring communication identification information for communication of a printer capable of performing communication by the communication unit and storing the same in the storage unit, and
wherein the computer transmits the token or the relation information to the printer at least after the storing the communication identification information for the communication.

12. The information processing apparatus including the computer according to claim 10,
wherein, to acquire the identification information, the computer performs operations comprising:
transmitting to the server a request for transmission of identification information, which is not transmitted to another information processing apparatus, to the information processing apparatus; and
acquiring the identification information, which is not transmitted to another information processing apparatus, from the server, as a reply to the request for transmission.

13. The information processing apparatus including the computer, according to claim 12,
wherein the computer performs operations comprising:
determining whether the identification information is stored in the storage unit;
when it is determined that the identification information is not stored in the storage unit, acquiring the identification information;
when it is determined that the identification information is stored in the storage unit, acquiring the token or the relation information, which are associated with the identification information stored in the storage unit from the server.

14. The information processing apparatus including the computer, according to claim 12, wherein the computer performs operations comprising:
determining whether the printer stores therein the token,
when it is determined that the printer does not store therein the token, transmitting to the server a request for transmission of identification information, which is not transmitted to another information processing apparatus, to the information processing apparatus; and
when it is determined that the printer stores therein the token:
transmitting to the server a request for transmission of identification information which is stored in the server with being associated with the token stored in the printer, and which has been already transmitted to another information processing apparatus from the server, to the information processing apparatus; and
acquiring identification information, which is stored with being associated with the token in the server and has been already transmitted to another information processing apparatus from the server, from the server, as a reply to the request for transmission.

15. The information processing apparatus including the computer, according to claim 12,
wherein the computer performs operations comprising:
determining whether the printer stores therein the token,
when the printer stores therein the token, transmitting a command, which instructs the server to store therein the identification information, which is acquired by the computer in the acquiring the identification information, and the token stored in the printer, with associating to each other.

16. The information processing apparatus including the computer, according to claim 10,
wherein the computer performs operations comprising:
determining whether the communication with the server through the communication unit is possible,
when it is determined that the communication with the server through the communication unit is possible, acquiring the identification information from the server,
when it is determined that the communication with the server through the communication unit is impossible, acquiring the identification information from the server at timing at which communication with the server through the communication unit becomes possible, after the install of the device driver in the installing is terminated.

17. The information processing apparatus including the computer, according to claim 10,
wherein the token is necessary to perform communication between the server and the printer, and
wherein the computer performs operations comprising:
determining whether the identification information is stored in the storage unit,
when it is determined that the identification information is not stored in the storage unit, acquiring the identification information;
when it is determined that the identification information is stored in the storage unit, determining whether communication with the server through the communication unit is possible,
wherein the computer performs operations comprising:
when it is determined that the communication with the server through the communication unit is possible, acquiring the token or the relation information, which are associated with the identification information stored in the storage unit from the server; and
when it is determined that the communication with the server through the communication unit is impossible:
acquiring, from the printer, printer specific information specific to the printer;
transmitting a command, which instructs the printer to transmit a request for transmission of the token to the server, to the printer; and
transmitting a command, which instructs the server to associate and the printer specific information acquired by the acquiring the printer specific information and the identification information stored in the storage unit, to the server.

18. The information processing apparatus including the computer, according to claim 17,
wherein the identification information stored in the storage unit is one of:
identification information, which is acquired from the server at timing at which the communication with the server through the communication unit becomes possible, when the communication with the server through the communication unit is impossible; and
identification information acquired before the device driver of the printer is installed.

19. A communication system comprising:
a printer having a printer control unit, and
an information processing apparatus including a storage unit and a communication unit capable of performing communication with a printer and a server, and an information-processing-apparatus control unit;
wherein the information-processing-apparatus control unit performs operations including:
installing a printer driver of a printer, the printer being capable of communicating with the information processing apparatus via a local network;
in response to installing the printer driver, requesting, to a server, to send identification information for identifying the information processing apparatus, the server being capable of communicating with the information processing apparatus via the Internet,
in response to the request, receiving the identification information for identifying the information processing apparatus from the server,
sending, to the printer, relation information related to the identification information, the relation information being used by the printer for receiving authentication information from the server, wherein the identification information for identifying the information processing apparatus and authentication information for authenticating the printer are stored in association with each other in the server;
after the printer receives the authentication information from the server, sending, to the server, print data for controlling the printer to print via the Internet, the print data being sent from the server to the printer and
wherein the printer control unit performs operation including:
acquiring token or the relation information transmitted by the information-processing-apparatus; and
performing communication with the server by using the token which is one of 1) transmitted by the information-processing-apparatus and 2) acquired from the server based on the relation information.

* * * * *